United States Patent [19]
Idera et al.

[11] Patent Number: 5,162,915
[45] Date of Patent: Nov. 10, 1992

[54] VIDEO SYSTEM HAVING VIDEO CAMERA AND VIDEO RECORDER THEREIN

[75] Inventors: Shuichi Idera, Kawasaki; Yoshiyuki Matsumura, Chofu; Minoru Noji, Sagamihara, all of Japan

[73] Assignee: Canon Kabushiki Kaisha, Tokyo, Japan

[21] Appl. No.: 589,683

[22] Filed: Sep. 28, 1990

[30] Foreign Application Priority Data

Sep. 28, 1989 [JP] Japan .................. 1-254327

[51] Int. Cl.⁵ .................. H04N 5/30; H04N 9/04
[52] U.S. Cl. .................. 358/224; 358/209; 358/906
[58] Field of Search .......... 358/209, 41, 906, 335, 358/224, 909, 182, 22, 183; 340/701; 360/14.1

[56] References Cited

U.S. PATENT DOCUMENTS

| | | | |
|---|---|---|---|
| 4,604,668 | 8/1986 | Lemelson | 360/10.1 |
| 4,809,079 | 2/1989 | Blazek et al. | 358/335 |
| 4,858,012 | 8/1989 | Hino et al. | 358/210 |
| 4,858,028 | 8/1989 | Okino | 358/335 |
| 4,928,137 | 5/1990 | Kinoshita | 358/213.26 |
| 4,945,424 | 7/1990 | Hiroki et al. | 358/335 |
| 4,959,735 | 9/1990 | Kawai | 358/342 |
| 5,030,979 | 7/1991 | Kobayashi et al. | 354/21 |

OTHER PUBLICATIONS

Popular Photography, Mar. 1984, "The New Age of 8-mm Video", pp. 71–73.

Primary Examiner—James J. Groody
Assistant Examiner—Safet Metjahic
Attorney, Agent, or Firm—Fitzpatrick, Cella, Harper & Scinto

[57] ABSTRACT

In a video system having a video camera unit for converting an image to electrical signals and a video recorder unit for recording the video signals from the video camera unit on a recording medium and reproducing the video signals recorded on the recording medium, a mode of the system is selectively set to a first mode in which the video recorder unit can record the video signals from the video camera unit on the recording medium or a second mode in which the video recorder unit can reproduce the video signals recorded on the recording medium, and a mode display displays different colors according to the set mode. An operation key performs a first function for controlling operations of the video camera unit in the first mode and a second function for controlling operations of the video recorder unit in the second mode. A display on a function display portion of the camera disposed adjacent to the operation key has a color corresponding to a display color of the mode display. As a result, it is possible to realize many functions using a small number of operation keys, and to reduce incorrect operations in operating the operation keys.

22 Claims, 4 Drawing Sheets

VIDEO SYSTEM HAVING VIDEO CAMERA AND VIDEO RECORDER THEREIN

BACKGROUND OF THE INVENTION

1. Field of the Invention

The present invention relates to a video system, and more particularly, to an improvement in the handling and operating characteristics of a video system which has a video camera and a video recorder therein.

2. Description of the Related Art

In recent years, an integral video camera and video tape recorder (VTR) provided in a single unit has become popular. An increasing number of these camera-VTRs have a camera mode in which the camera is in operation and in which the VTR can be set either in an operation state or in a recording pause state, and a VTR mode in which the camera is not operating mainly in order to perform reproducing operations by the VTR in order to record pictures taken by the camera in the VTR.

By having the camera mode and the VTR mode as described above, the camera-VTR can provide improved handling and operating characteristics, and reduce its consumption of electricity.

In general, the camera mode and the VTR mode are switched by an operation switch, such as a slide switch. Another known method switches the above modes by opening and closing a lens cover of the camera. However, mounting these kinds of operation members adds unnecessary structure and this is not desirable for making this kind of camera-VTR smaller, lighter and more inexpensive.

Furthermore, since a VTR having the above two modes needs various kinds of operation keys, a control panel tends to be larger and subdivided, while it is necessary to make each operation key and the intervals therebetween smaller. Therefore, such mode-switching operation members will increase the likelihood that incorrect operations will be caused and the VTR will be more difficult to operate.

SUMMARY OF THE INVENTION

Against this background, an object of the present invention is to improve the handling and operating characteristics of a system having a video camera and a video recorder therein and to make the system smaller.

In order to achieve the above object, a video system according to the present invention includes a video camera unit for converting an image to electrical signals. A video recorder unit is also provided for recording the video signals from the camera unit on a recording medium, and for reproducing the video signals recorded on the recording medium. Mode setting means are provided for setting a mode of the system to one of a plurality of modes including a first mode in which the video recorder unit records the video signals from the camera and a second mode in which the video recorder unit reproduces the video signals recorded on the recording medium. Mode display means (including a mode display) are provided for displaying one color when the mode setting means sets the system in the first mode and a different color when the mode setting means sets the system in the second mode. An operation key activates a first function to control the video camera unit in the first mode, and activates a second function to control the video recorder unit in the second mode. Finally, a function display is provided disposed adjacent the operation key, for displaying the first and second functions of the operation key. The function display displays the first and second functions in different colors corresponding to the colors of the mode display.

According to a further aspect of the present invention, a video system includes a camera unit for converting an image to electrical video signals, and a video recorder unit for recording the video signals from the camera unit on a recording medium and reproducing the video signals recorded on the recording medium. A mode setting means is provided for setting a mode of the system to one of a plurality of modes including a first mode in which the video recorder unit records the video signals from the camera unit on the recording medium and a second mode in which the video recorder unit reproduces the video signals recorded on the recording medium. An operation key is provided for activating a first function to control operations for altering the video signals from the camera unit in the first mode, and for activating a second function to control operations of the video recorder unit in the second mode.

According to a further aspect, the present invention includes a video system having a video camera unit for converting an image to electrical video signals, and a video recorder unit for recording the video signals from the camera unit on a recording medium and for reproducing the video signals recorded on the recording medium. A mode setting means is provided for setting a mode of the system to one of a plurality of modes including a first mode in which the video recorder unit records the video signals from the camera unit on the recording medium and a second mode in which the video recorder unit reproduces the video2 signals recorded on the recording medium. An operation key is provided for activating a first function to control operation for controlling a lens of the video camera unit in the first mode, and for activating a second function to control operations of the video recorder unit in the second mode.

According to yet a further aspect of the present invention, a video system includes a video camera unit for converting an image to electrical video signals. A video recorder unit is provided for recording the video signals from the video camera unit on a recording medium, and for reproducing the video signals recorded on the recording medium. A mode setting means is provided for setting a mode of the system to one of a plurality of modes including a first mode in which the video recorder unit records the video signals from the camera unit on the recording medium and a second mode in which the video recorder unit reproduces the video signals recorded on the recording medium. An operation key is provided for activating a first function to control operations of the video camera unit in the first mode, and for activating a second function to control a movement of the recording medium in the video recorder unit in the second mode.

According to yet a further embodiment, the present invention includes a video system having a camera unit for converting an image to electrical video signals. A video recorder unit is provided for recording the video signals from the video camera unit on a recording medium, and for reproducing the video signals recorded on the recording medium. A mode setting means is provided for setting a mode of the system to one of a plurality of modes including a first mode in which the video recorder unit records the video signals from the camera unit on the recording medium and a second mode in which the video recorder unit reproduces the video signals recorded on the recording medium. An operation key activates a first function for controlling operations of the video camera unit in the first mode, and activates a second function to control a reproducing speed of the video signals by the video recorder unit in the second mode.

According to yet another aspect of the present invention, control apparatus for use with an integral video camera-recorder includes a mode switch switchable between a first video camera mode and a second video recorder mode. A plurality of manually-operable control keys are provided, each key activating a first function in the first mode and a second function (different from the function) in the second mode.

Objects and features other than the above will be apparent from the following detailed description of an embodiment of the present invention with reference to the drawings.

DETAILED DESCRIPTION OF THE PREFERRED EMBODIMENT

An embodiment of the present invention will now be described.

Figure 1:
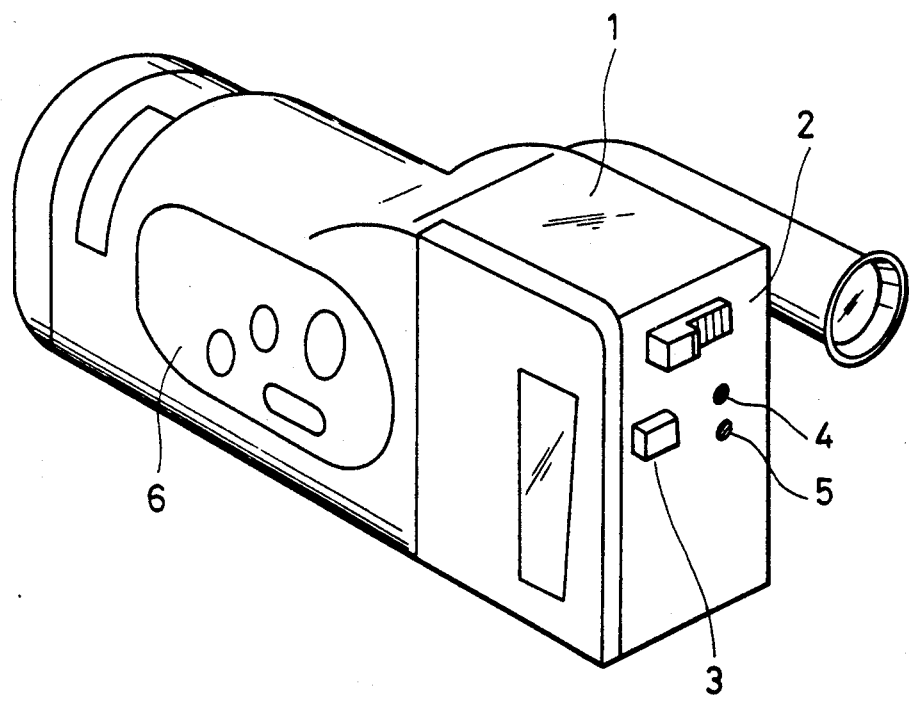
FIG. 1 is a perspective view of a camera-VTR as an embodiment of the present invention.

FIG. 1 is a perspective view of a camera-VTR as an embodiment of the present invention. Referring to the figure, the camera-VTR has a main body 1 containing a camera unit and a VTR unit, a power switch 2, a switching button 3 for switching between a camera mode and a VTR mode (referred to as "a mode button" hereinafter), a display light emitting diode 4 for emitting a red light in the VTR mode (referred to as "a VTR mode LED" hereinafter), a display light emitting diode 5 for emitting a green light in the camera mode (referred to as "a camera mode LED" hereinafter), and a control panel unit 6 on which a group of operation keys to be used in the camera mode and the VTR mode are arranged.

Figure 2:
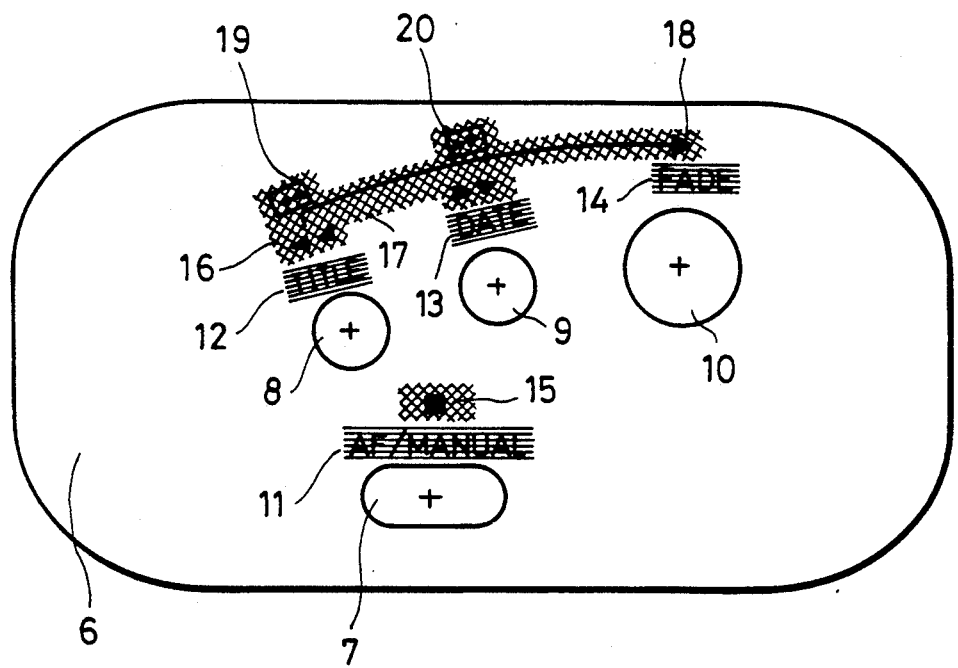
FIG. 2 is an enlarged view of a control panel of the camera-VTR shown in FIG. 1.

FIG. 2 is an enlarged view of the control panel unit 6 shown in FIG. 1. Referring to the figure, operation keys 7 to 10 function as operation keys for determining operations of the camera in taking a picture in the camera mode and as operation keys for determining operations of the VTR in the VTR mode. Numerals 11 to 14 denote displays for displaying the functions of the keys 7 to 10 in the camera mode, and numerals 15 to 20 denote displays for displaying the functions of the keys 7 to 10 in the VTR mode.

Figure 3:
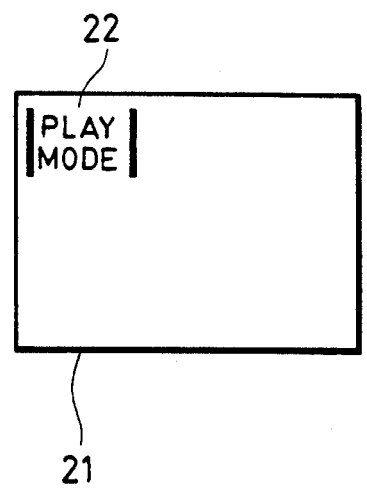
FIG. 3 is a view showing a typical display in a finder of the camera-VTR shown in FIG. 1.

FIG. 3 shows an example of a mode display in an electronic finder in the VTR mode. Referring to the figure, 21 denotes an angle of view of the finder and 22 denotes the example of the mode display.

Figure 4:
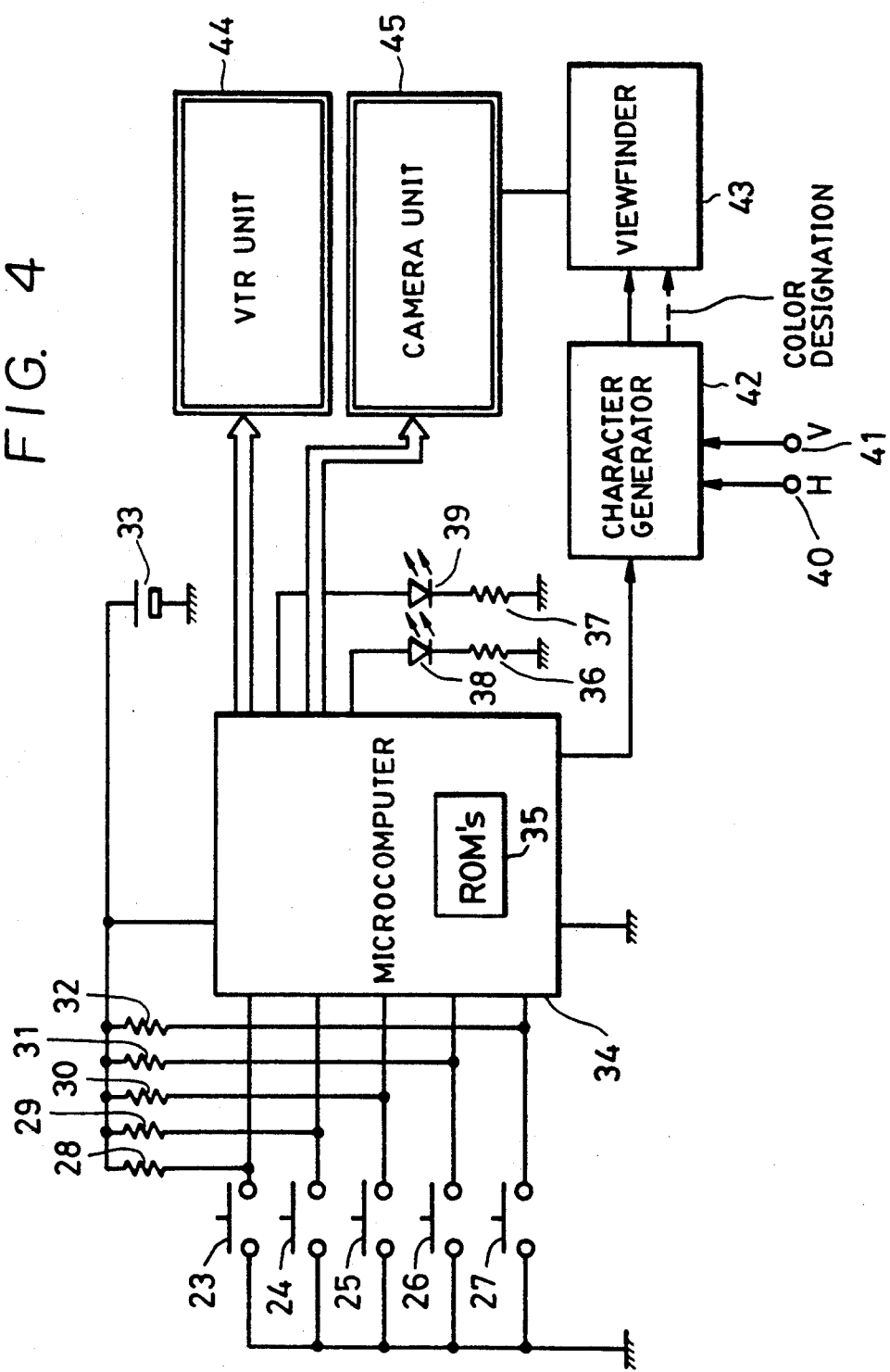
FIG. 4 is a block diagram showing a structure of a main circuit in the camera-VTR shown in FIG. 1.

FIG. 4 is a block diagram showing a structure of a main circuit in the camera-VTR of the embodiment. Referring to FIG. 4, the circuit is composed of switches 23 to 26 corresponding to the operation keys 7 to 10, a mode switch 27 corresponding to the button 3 for switching between the camera mode and the VTR mode, pull-up resistors 28 to 32 connected to the switches 23 to 27 for holding one side of the switches at supply potential when each switch is OFF, and a power supply 33 connected to the pull-up resistors 28 to 32 and each circuit. The circuit is also composed of a microcomputer 34 for outputting control signals corresponding to each operation mode to the camera unit and the VTR unit according to the states of the switches 23 to 27, read-only memories (ROMs) 35 connected to the microcomputer 34, current restricting resistors 36 and 37 respectively for a camera mode LED 38 corresponding to the LED 5 shown in FIG. 1 and a VTR mode LED 38 corresponding to the LED 4 shown in FIG. 1, a circuit block 44 of the VTR unit, a circuit block 45 of the camera unit, a character generator 42 for displaying a mode in a viewfinder, a viewfinder 43, and input terminals 40 and 1 for synchronizing signals supplied to the character generator 42.

Operations of each unit in the system of the embodiment shown in FIGS. 1, 2 and 4 will be described.

When the power switch 2 shown in FIG. 1 is turned on, the microcomputer 34 shown in FIG. 4 sets the system in the camera mode, sets the VTR unit 44 in the recording pause state and the camera unit 45 in the operating state, and turns on the camera mode LED 38. The LED 38 is mounted in the position of the LED 5 shown in FIG. 1 and emits a green light. In this state, the switches 23 to 26 shown in FIG. 4 are manipulated for determining the operations of the camera. For example, each time the switch 23 is turned on by pressing the operation key 7 shown in FIG. 2, the microcomputer 34 shown in FIG. 4 alternately switches between an automatic (AF) mode and a manual (MANUAL) mode of a focusing mechanism of the camera unit 45.

When the operation keys 8 and 9 are manipulated in the same manner as above, the switches 24 and 25 are turned on. Each time the switches 24 and 25 are turned on, the microcomputer 34 switches between the state in which the camera unit 45 superimposes characters corresponding to "title" and "date" on video signals and the state in which the camera unit 45 does not superimpose these characters. Furthermore, when the operation key 10 is activated, the switch 26 is turned on. The microcomputer 34 fades video signals output from the camera unit 45 in the on state of the switch 26, and releases the video signals output from the camera unit 45 from being faded in the off state of the switch 26.

The displays corresponding to these functions in the camera mode are arranged in the positions 11 to 14 shown in FIG. 2. Referring to FIG. 2, the horizontally-striped portions are green-based portions (the camera surface is colored green) and correspond to the green light emitted from the camera mode LED 5 so that the VTR is easy to operate.

When the button 3 corresponding to the mode switch 27 shown in FIG. 4 is pressed in the camera mode, the microcomputer 34 releases the camera unit 45 from the operating state, sets the VTR unit 44, for example, in the stop mode, and switches the system from the camera mode to the VTR mode. At the same time, the VTR mode LED 39 is turned on. The LED 39 is mounted in the position of the LED 4 shown in FIG. 1 and emits a red light.

In this state, the switches 23 to 26 shown in FIG. 4 function as switches for determining the operations of the VTR. For example, when the switch 26, which corresponds to the operation key 10 shown in FIG. 2, is turned on by operating the key 10, if the VTR unit 44 is in the pause mode, the microcomputer 34 shown in FIG. 4 sets the VTR unit 44 in the reproduction mode. Similarly, when the switches 24 and 25 are turned on by operating the operation keys 8 and 9 shown in FIG. 2, if the VTR unit 44 is in the stop mode, the microcomputer 34 sets the VTR unit 44 in each of rewind and fast forward modes. If the VTR unit 44 is in the reproduction mode, the microcomputer 34 sets the VTR unit 44 in either a rewind search (review) mode or a rapid search (cue) mode when the switches 24 and 25 are turned on by operating the operation keys 8 and 9. Furthermore, when the VTR unit 44 is in either the reproduction, rewind, fast forward, review, or cue mode and the switch 26 is turned by operating the operation key 7, the microcomputer 34 sets the VTR unit 44 in the stop mode.

The displays corresponding to the functions of the operation keys 7 to 10 in the VTR mode are arranged in the positions indicated by 15 to 20 in FIG. 2. Referring to FIG. 2, crosshatched portions are red-based portions (the camera surface is colored red) and correspond to the red light emitted from the VTR mode LED 4, so that it is possible to visually recognize the functions of the operation keys 7 to 10.

When the button 3 is operated in the VTR mode, the switch 27 is turned on and the microcomputer 34 sets the VTR unit 44 and the camera unit 45 in the camera mode.

The microcomputer 34 transmits the information regarding which one mode of the VTR mode and the camera mode is set, to the character generator 42. The character generator 42 generates character information corresponding to each mode in accordance with the mode information and horizontal (H) synchronizing signals and vertical (V) synchronizing signals input from the input terminals 40 and 41, and displays the character information on the viewfinder 43. If the viewfinder is a color viewfinder, the character generator 42 supplies color designation information to the view finder 43 so as to display the characters (shown in FIG. 3) showing the VTR mode characters in red and the camera mode characters in green. Such a correspondence between the display color of the finder and the base color of the control panel 6 can make the functions of the operation keys 7 to 10 clear, thereby preventing incorrect operations.

In a camera-VTR having the above-mentioned composition, since the camera mode (a first mode) and the VTR mode (a second mode) share the operation keys for determining the operations of the camera (a title inserting key, a date inserting key, a fade key and an automatic/manual focusing switching key), and the operation keys for determining the operations of the VTR (a reproduction key, a fast forward key, a rewind key and a stop key), the number of keys can be decreased even in using the above two kinds of modes. Furthermore, since the space between the keys can be large, the keys are easy to use. Still further, since common keys are used for keys which are frequently used (e.g., the common key used as the fade key and the reproduction key) are large, it is even easier for an operator to use the camera-VTR.

In the above-described embodiment, since the camera mode LED 4 and the VTR mode LED 5 are lit in colors (green and red) according to the mode, and since the portions for displaying the functions of the operation keys in each mode are of colors corresponding to the above light colors, the operator can visually grasp the functions of each operation key. As a result, it is possible to decrease incorrect operations and so on.

Furthermore, in the above-described embodiment, since the camera mode and the VTR mode are also displayed in the electronic viewfinder in the colors corresponding to the above display colors, it is ever more unlikely that incorrect operation will result.

In addition, in the embodiment, since the camera mode is first set when the power is turned on, it is possible to quickly take advantage of a sudden chance to take a picture.

As described above, according to the present invention, since the first mode for recording the video signals from the camera and the second mode for reproducing the video signals share operation keys, it is possible to decrease the number of operation keys, thereby making the whole system smaller and easier to operate.

The individual components shown in outline or designated by blocks in the Drawings are all well-known in the video camera-recorder arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video system, comprising:
   (a) a video camera unit for converting an image to electrical video signals;
   (b) a video recorder unit for recording the video signals from said video camera unit on a recording medium, and for reproducing the video signals recorded on the recording medium;
   (c) mode setting means for setting a mode of said system to one of a plurality of modes, the plurality of modes including a first mode in which said video recorder unit records the video signals from said video camera unit on the recording medium and a second mode in which said video recorder unit reproduces the video signals recorded on the recording medium;
   (d) mode display means including a first display element which displays one color when said mode setting means sets said system in the first mode and a second display element which displays a different color when said mode setting means sets said system in the second mode;
   (e) an operation key for activating a first function to control operations of said video camera unit in the first mode, and for activating a second function to control operations of said video recorder unit in the second mode; and
   (f) a function display disposed adjacent said operation key for displaying the first and second functions of said operation key, said function display having different colors, corresponding to the colors of said first and second display elements, for displaying the first and second functions.

2. A system according to claim 1, wherein said mode setting means includes a manually-operable mode setting switch, and wherein said first and second display elements are disposed adjacent said mode setting switch.

3. A system according to claim 1, wherein the first function controls operations for altering the video signals from said video camera unit.

4. A system according to claim 3, wherein the first function controls operations for fading the video Signals from said video camera unit.

5. A system according to claim 3, wherein the first function controls operations for synthesizing the video signals from said video camera unit with further video signals.

6. A system according to claim 5, wherein the further video signals comprise binary video signals for representing character information.

7. A system according to claim 6, wherein the binary video signals represent a date.

8. A system according to claim 1, wherein the first function produces lens control signals in said video camera unit.

9. A system according to claim 1, wherein the second function controls reproduction operations of said video recorder unit.

10. A system according to claim 9, wherein the second function controls a reproduction speed of video signals reproduced by said video recorder unit.

11. A system according to claim 1, wherein the second function controls a feeding speed of the recording medium in said video recorder unit.

12. A video system, comprising:
(a) a video camera unit for converting an image to electrical video signals;
(b) a video recorder unit for recording the video signals from said video camera unit on a recording medium, and for reproducing the video signals recorded on the recording medium;
(c) mode setting means for setting a mode of said system to one of a plurality of modes, the plurality of modes including a first mode in which said video recorder unit records the video signals from said video camera unit on the recording medium, and a second mode in which said video recorder unit reproduces the video signals recorded on the recording medium;
(d) an electric view finder for selectively displaying either the video signals from said video camera unit or the video signals reproduced by said video recorder unit, said electric view finder providing (1) an information display in one color when said mode setting means sets said system in the first mode and (2) an information display in a different color when said mode setting means sets said system in the second mode;
(e) an operation key for activating a first function to control operations of said video camera unit in the first mode, and for activating a second function to control operations of said video recorder unit in the second mode; and
(f) a function display panel disposed adjacent said operation key for displaying the first and second functions of said operation key, said function display panel having different colors, corresponding to the colors of said information display, for displaying the first and second functions.

13. A system according to claim 12, further comprising a character generator responsive to said mode setting means for producing color character signals which are the one color or the different color.

14. A system according to claim 12, wherein the first function controls operations for altering the video signals from said video camera unit.

15. A system according to claim 14, wherein the first function controls operations for fading the video signals from said video camera unit.

16. A system according to claim 15, wherein the first function controls operations for synthesizing the video signals from said video camera unit with further video signals.

17. A system according to claim 16, wherein the further video signals comprise binary video signals for representing character information.

18. A system according to claim 17, wherein the binary video signals represent a date.

19. A system according to claim 12, wherein the first function produces lens control signals in said video camera unit.

20. A system according to claim 12, wherein the second function controls reproduction operations of said video recorder unit.

21. A system according to claim 20, wherein the second function controls a reproduction speed of video signals reproduced by said video recorder unit.

22. A system according to claim 12, wherein the second function controls a feeding speed of the recording medium in said video recorder unit.

* * * * *

UNITED STATES PATENT AND TRADEMARK OFFICE
CERTIFICATE OF CORRECTION

PATENT NO. : 5,162,915
DATED : November 10, 1992
INVENTOR(S) : IDERA ET AL.

It is certified that error appears in the above-identified patent and that said Letters Patent is hereby corrected as shown below:

Column 2

Line 34, "video 2" should read --video--.

Column 4

Line 19. "1" should read --41--.

Column 7

Line 10, "Sig-" should read --sig--.

Column 8

Line 28, "claim 15," should read --claim 14,--.

Signed and Sealed this

Twenty-first Day of December, 1993

Attest:

BRUCE LEHMAN

Attesting Officer

Commissioner of Patents and Trademarks